JAMES A. MORRISON.

Improvement in Lock-Nuts.

No. 126,223.  Patented April 30, 1872.

Witnesses:  
A Bennerkendorf.  
Geo W. Mabee

Inventor:  
J. A. Morrison  
PER  
Attorneys.

126,223

UNITED STATES PATENT OFFICE.

JAMES A. MORRISON, OF PARKER'S LANDING, PENNSYLVANIA, ASSIGNOR TO HIMSELF AND GEORGE H. MORRISON, OF SAME PLACE.

IMPROVEMENT IN LOCK-NUTS.

Specification forming part of Letters Patent No. 126,223, dated April 30, 1872.

Specification describing a new and Improved Nut-Lock, invented by JAMES A. MORRISON, of Parker's Landing, in the county of Armstrong and State of Pennsylvania.

The object of this invention is to provide simple and efficient means for preventing the nuts of screw-bolts from working off when in use; and it consists in a collar with one or more springs or plates attached thereto, the ends of which springs or plates are made to engage with the screw-nut, the construction being as hereinafter more fully described.

Figure 1:
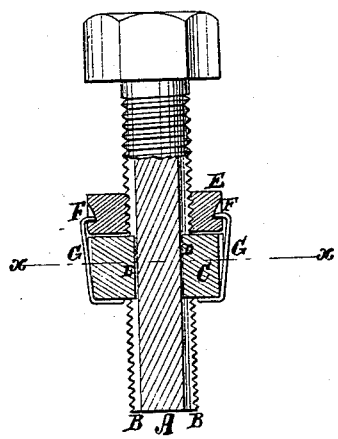
Figure 2:
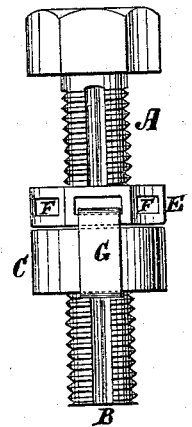
Figure 3:
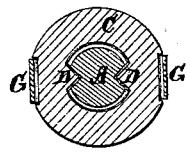

In the drawing, Figure 1 represents a sectional view of a bolt provided with my locking device. Fig. 2 is a side view of the same. Fig. 3 is a cross-section of Fig. 1 taken on the line $x\ x$.

Similar letters of reference indicate corresponding parts.

A is the bolt, in which I make one or more V or other shaped grooves, B. C is a collar, which slips onto the bolt; this collar has a rib or ribs, D, on its inner side, which engages with the grooves B, which prevents the collar from turning around on the bolt. E is the screw-nut, which may be of any desired form, preferably of polygonal form, of four or more sides, in which sides a recess, F, is made, as seen in the drawing. G G are springs or spring-plates attached to the collar C in any suitable and substantial manner, the ends of which project from the collar and are bent so as to enter the recess F of the nut, as seen in Fig. 1. These springs securely hold the nut in place, as they confine it to the collar, which cannot turn. In some cases—instead of springs G, one or more—there may be one or more non-elastic plates attached to the collar, with projecting ends, which shall engage with the side or sides of the nut and thus secure the nut to the collar. In this case the recesses F would be dispensed with.

The essential feature of my invention is the springs or plates G G, one or more, for connecting the nut with a collar on the bolt. I do not confine myself to the precise mode described for preventing the collar from turning, although I consider the plan shown as the best. In many cases bolts are placed near together, so that a single collar-plate or bar would answer for two or more bolts, in which case the springs G would be attached to the plate for each nut. I do not, therefore, limit or confine myself to the precise form or arrangement of any of the parts described, as they may be varied in many ways without departing from my invention.

Having thus described my invention, I claim as new and desire to secure by Letters Patent—

The combination of grooved bolt A B, ribbed collar C D, recessed nut E F, and springs G G, all constructed and arranged as described to form a bolt and nut-lock.

JAMES A. MORRISON.

Witnesses:
DAVID GIRD,
T. D. EURIGHT.